United States Patent [19]
Kaku

[11] Patent Number: 6,140,429
[45] Date of Patent: Oct. 31, 2000

[54] INJECTION MOLDABLE POLYIMIDE RESIN COMPOSITION AND A METHOD OF PRODUCING ITS MOLDED ARTICLES

[75] Inventor: Mureo Kaku, Kanagawa, Japan

[73] Assignee: E. I. du Pont de Nemours and Company, Wilmington, Del.

[21] Appl. No.: 09/308,401

[22] PCT Filed: Nov. 21, 1997

[86] PCT No.: PCT/US97/21591

§ 371 Date: May 18, 1999

§ 102(e) Date: May 18, 1999

[87] PCT Pub. No.: WO98/22533

PCT Pub. Date: May 28, 1998

[30] Foreign Application Priority Data

Nov. 22, 1996 [JP] Japan ................................. 8-312290

[51] Int. Cl.⁷ ........................ C08L 67/00; C08L 77/00
[52] U.S. Cl. .................. 525/425; 525/420; 525/432; 525/436
[58] Field of Search ............................. 525/432, 436

[56] References Cited

U.S. PATENT DOCUMENTS

| | | | |
|---|---|---|---|
| 3,179,631 | 4/1965 | Endrey | 260/78 |
| 3,249,588 | 5/1966 | Gall | 260/47 |
| 4,481,339 | 11/1984 | Bolon | 525/424 |
| 4,755,555 | 7/1988 | Manwiller et al. | 524/607 |
| 5,183,864 | 2/1993 | Nelb, II et al. | 525/452 |
| 5,470,922 | 11/1995 | Kaku et al. | 525/436 |

FOREIGN PATENT DOCUMENTS

| | | |
|---|---|---|
| 0361313 | 4/1990 | European Pat. Off. . |
| WO 94/14895 | 7/1994 | WIPO . |

OTHER PUBLICATIONS

International Search Report, dated Apr. 6, 1998.

*Primary Examiner*—Ana Woodward

[57] ABSTRACT

A method of producing an injection moldable polyimide resin composition, which is characterized by the fact that at least one aromatic acid anhydride and at least one aromatic diamine are directly combined with at least one polymer that can be melt molded at a temperature lower than 400° C. Furthermore, the resulting product can be heat treated.

6 Claims, No Drawings

6,140,429

INJECTION MOLDABLE POLYIMIDE RESIN COMPOSITION AND A METHOD OF PRODUCING ITS MOLDED ARTICLES

FIELD OF THE INVENTION

This invention pertains to a method of producing a polyimide resin composition that can be injection molded and has excellent high-temperature performance, and in further detail, to a new method of producing a polyimide resin composition without producing polyamide acid.

BACKGROUND OF THE INVENTION

Aromatic polyimide is known as a resin with excellent heat resistance and mechanical properties U.S. Pat. No. 3,179,631, U.S. Pat. No. 3,249,588 and U.S. Pat. No. 4,755,555), and it is widely used in jet engines, business equipment, and automobile parts. Nevertheless, there is a tendency toward restriction of its use because many polyimides are difficult to mold. In particular, many polyimides are molded into the desired shape, such as films, etc., before the polyamide acid, which is a precursor to polyimide, changes to polyimide, or are molded from a molded article of polyimide into the desired shape by machine molding.

Therefore, there is a need for an injection-moldable polyimide resin composition. In order to solve this invention, a polyimide polymer mixture is disclosed (U.S. Pat. No. 5,470,922, which is incorporated herein by reference) that is made from at least one polymer that can be melted and molded at a temperature lower than 400° C. and that is selected from polyamide and polyester, preferably polyamide or polyester in the form of a liquid crystal polymer, and polyamide acid. This polyimide polymer mixture has heat resistance and mechanical properties rivaling those of conventional aromatic polyimide and excellent injection molding performance.

Nevertheless, because polyamide acid is used to produce this polymer mixture, a process for producing polyamide acid is needed. Therefore, simplification of the manufacturing process is needed. This invention presents a new method of producing an injection-moldable polyimide resin composition with better mechanical properties by a simpler manufacturing method.

SUMMARY OF THE INVENTION

In order to solve the aforementioned problems, this invention is a method of producing injection moldable polyimide resin composition, which is characterized by the fact that at least one aromatic acid anhydride and at least one aromatic diamine are directly combined with at least one polymer that can be melt molded at a temperature lower than 400° C.

Furthermore, at least one aromatic acid anhydride and at least one aromatic diamine are directly combined with at least one polymer that can be melted and molded at a temperature lower than 400° C. and the product is heat treated.

Moreover, this invention is a method of producing molded articles, which is characterized by the fact that a polyimide resin composition obtained by directly combining at least one aromatic acid anhydride and at least one aromatic diamine with at least one polymer that can be melted and molded at a temperature lower than 400° C. is injection molded and then the molded article is heat treated.

DETAILED DESCRIPTION OF THE INVENTION

The polymer used in this invention is a polymer that can be melt molded at a temperature lower than 400° C. The melt-moldable polymer is a polymer that can be molded by an extrusion device at a specific temperature without any degradation. It is a polyamide, polyester, their mixture, etc. Actual examples of polyamides are nylon 6, nylon 66, nylon 610, nylon 612, etc., and mixtures of one or more polyamides can also be used. Actual examples of the polyester are polybutylene terephthalate, polyethylene terephthalate, etc., and mixtures of two or more polyesters can be used. The polyamide or polyester should be a liquid crystal polymer. A liquid crystal polymer is usually a polyester, but it is not limited to polyester. This includes polyester amide and polyester imide.

Examples of the aromatic acid anhydride used in this invention are pyromellitic anhydride, 3,3',4,4'-biphenyl tetracarboxylic anhydride, etc., and examples of the aromatic diamine are oxydianiline and para-phenylene diamine. Two or more of these aromatic acid anhydrides can be used, and two or more of these aromatic diamines can be used.

By means of this invention, the aromatic acid anhydride and aromatic diamine can be directly combined with the aforementioned polymer without preparing polyamide acid from aromatic acid anhydride and aromatic diamine. They can be combined by conventional methods. For instance, a conventional mixer or extruder can be used. It is preferred that after dry blending the aromatic acid anhydride and aromatic diamine, the mixture be fed to the mixer or extruder with the aforementioned polymer and then kneaded. Moreover, the kneading temperature is 100 to 390° C., preferably 200 to 380° C.

The amount of polymer that can be melted and molded at a temperature lower than 400° C. is 20 to 99 wt %, preferably 40 to 95 wt %, particularly 50 to 90 wt %.

The amount of aromatic acid anhydride and aromatic diamine is the equimolar amount. However, the final properties of the polyimide resin composition that is obtained can be changed by increasing either the amount of aromatic acid anhydride or the aromatic diamine.

The combination of aromatic acid anhydride and aromatic diamine added directly to the aforementioned polymer can be further heat treated. Mechanical properties of the molded article are improved by heat treatment. The same tendency is observed by heat treatment of a polyimide resin composition that has been produced via polyamide acid, but improved bending modulus, which is not possible with a polyimide resin composition that is obtained through polyamide acid, is seen in the case of a polyimide resin composition produced by the method of this invention. Heat treatment can also be performed on molded articles obtained by injection molding of polyimide resin composition produced by the method of this invention. Heat treatment is performed at the optimum temperature and for the optimum time in accordance with the polyimide resin composition and shape of the molded article without melting the polymer that is used. Heat treatment is normally performed for 2 to 72 hours at a temperature of 300 to 350° C. Heat treatment can be performed in air, but it is preferred that heat treatment be performed in a nitrogen atmosphere.

By means of the method of producing a polyimide resin composition of this invention, the polymer, aromatic acid anhydride and aromatic diamine can be uniformly mixed with a filler, such as graphite, molybdenum disulfide, glass fibers, tetrafluoro-ethylene polymer and copolymer, etc.

EXAMPLES

This invention will now be described with examples, but this invention is not limited to these examples.

Examples 1 Through 3

After dry blending pyromellitic anhydride (PMDA) and oxydianiline (ODA), these were fed to a 28 mm bi-axial extruder with polyester liquid crystal polymer (high-melting-point grade Zenite™ 6000 as manufactured by E.I. du Pont de Nemours and Company) and kneaded at a barrel temperature of 340° C. The extruder had 2 vacuum holes. The screw was operated at 150 rpm and extrusion was performed at a rate of 2.3 to 4.6 kg per 1 hour. The polyimide resin composition that was obtained was extrusion molded at a cylinder temperature of approximately 340° C. to make a test piece. The experiments were performed in accordance with the following ASTM methods.

| | |
|---|---|
| Tensile experiment | ASTM D638 |
| Bending experiment | ASTM D790 |
| Loaded bending temperature | ASTM D648 | temperature (HDT) are shown in Table 1.

Example 4

Other than the fact that pyromellitic anhydride (PMDA), oxydianiline (ODA), and tetrafluoroethylene polymer (Zonyl® fluoroadditive MP1500 as supplied by E.I. du Pont de Nemours and Company) were dry blended, a test piece was made as in Examples 1 through 3 and mechanical properties and the HDT were determined. The results are shown in Table 1.

Examples 5 and 6

A test piece was made as in Example 2 or Example 4 and the piece was heat treated for 28 hours in an oven at 305° C. Then mechanical properties and HDT were determined. The determination results are shown in Table 1.

Comparative Examples 1 Through 3

Polyamide acid was synthesized from pyromellitic anhydride (PMDA) and oxydianiline (ODA) in pyridine and then polyamide acid powder was made by bringing the acid into contact with acetone, which is a non-solvent of polyamide acid, for precipitation. The polyamide acid powder that was obtained was fed to a 28 mm bi-axial extruder as in Examples 1 through 3 with the same liquid crystal polymer as in Examples 1 through 3 and kneaded at a barrel temperature of 340° C. A test piece was made as in Examples 1 through 3. Then mechanical properties and HDT were determined. The determination results are shown in Table 2.

Comparative Example 4

Other than the fact that polyamide acid was made as in Examples 1 through 3 and tetrafluoroethylene polymer (Zonyl® fluoroadditive MP1500) was added, a test piece was made and mechanical properties and the HDT were determined as in Comparative Examples 1 through 3. The determination results are given in Table 2.

Comparative Examples 5 Through 7

A test piece was made as in Comparative Examples 2, 3, and 4, and then heat treatment was performed for 28 hours in an oven at 305° C. Mechanical properties and the HDT were determined. The results are shown in Table 2.

TABLE 1

| | Ex.1 | Ex.2 | Ex.3 | Ex.4 | Ex.5 | Ex.6 |
|---|---|---|---|---|---|---|
| Polymer (wt %) | 90 | 70 | 50 | 56 | 70 | 56 |
| PMDA (wt %) | 4.9 | 14.6 | 24.4 | 11.7 | 14.6 | 11.7 |
| ODA (wt %) | 5.1 | 15.4 | 25.6 | 12.3 | 15.4 | 12.3 |
| Fluorine resin (wt %) | 0 | 0 | 0 | 20 | 0 | 20 |
| Tensile strength (kg/cm$^2$) | 1349 | 1054 | 548 | 667 | 1180 | 759 |
| Elongation (%) | 4.2 | 4.4 | 1.5 | 1.7 | 5.1 | 1.9 |
| Tensile modulus (kg/cm$^2$) | 74595 | 58931 | 46850 | 57878 | 54928 | 57175 |
| Bending modulus (kg/cm$^2$) | 1110 | 1138 | 773 | 885 | 1271 | 1004 |
| Bending strength (kg/cm$^2$) | 51205 | 56262 | 38632 | 59493 | 55490 | 56894 |
| Notched Izod strength (kg.cm/cm) | 13.87 | 11.32 | 4.46 | 5.39 | 17.14 | 8.11 |
| HDT(° C.) | 242 | 235 | — | 244 | 275 | 300 |

TABLE 2

| | Comp. Ex.1 | Comp. Ex.2 | Comp. Ex.3 | Comp. Ex.4 | Comp. Ex.5 | Comp. Ex.6 | Comp. Ex.7 |
|---|---|---|---|---|---|---|---|
| Polymer (wt %) | 90 | 70 | 50 | 56 | 70 | 50 | 56 |
| Polyamide acid (wt %) | 10 | 30 | 50 | 24 | 30 | 50 | 24 |
| Fluorine resin (wt %) | 0 | 0 | 0 | 20 | 0 | 0 | 20 |
| Tensile strength (kg/cm$^2$) | 1208 | 773 | 457 | 471 | 864 | 443 | 562 |
| Elongation (%) | 2.1 | 2.6 | 1.9 | 1.8 | 3.3 | 2.3 | 2.8 |

TABLE 2-continued

|  | Comp. Ex.1 | Comp. Ex.2 | Comp. Ex.3 | Comp. Ex.4 | Comp. Ex.5 | Comp. Ex.6 | Comp. Ex.7 |
|---|---|---|---|---|---|---|---|
| Tensile modulus (kg/cm$^2$) | 61952 | 57456 | 34137 | 45007 | 55981 | 32451 | 33224 |
| Bending modulus (kg/cm$^2$) | — | 583 | 471 | 485 | 562 | 450 | 457 |
| Bending strength (kg/cm$^2$) | — | 40388 | 31819 | 34137 | 38492 | 29782 | 31608 |
| Notched Izod strength (kg.cm/cm) | 11.42 | 7.07 | 3.43 | 4.18 | 8.43 | 3.75 | 5.39 |
| HDT(° C.) | 233 | 237 | 222 | 229 | 279 | 298 | 302 |

When the Examples of the invention are compared to the Comparative Examples, the polyimide resin composition produced by the method of this invention, shows improved mechanical properties while retaining an excellent loaded bending temperature, as expected. This tendency is the same when Example 4 and Comparative Example 4, to which fluorine resin was added, are compared. Moreover, when Example 2 and Example 5 and Example 4 and Example 6 are compared, it is clear that tensile strength, elongation, notched Izod strength and loaded bending temperature are improved in Examples 5 and 6 by performing heat treatment. These results of heat treatment are the same when Comparative Examples 2 and 5, Comparative Examples 3 and 6 and Comparative Examples 4 and 7 are compared. However, there is further improvement of bending elongation by heat treatment in the Examples.

As was previously explained, by means of the production method of this invention, production can be easily performed without necessitating the production of polyamide acid and injection-moldable polyimide resin composition with better mechanical properties that conventional polyimide resin compositions made via polyamide acid can be produced. In addition, molded articles with excellent mechanical properties can be made by heat treatment of the composition when polyimide resin composition is being made, or by heat treatment of an injection molded article of polyimide resin composition.

What is claimed is:

1. A method of producing an injection moldable polyimide resin composition comprising, combining at least one aromatic acid anhydride and at least one aromatic diamine with at least one polymer that can be melted and molded at a temperature lower than 400° C.

2. The method of producing an injection moldable polyimide resin composition of claim 1, wherein the polyimide composition is heat treated.

3. The method of producing the polyimide resin composition in claim 1 or 2, wherein the polymer that can be melted and molded at a temperature lower than 400° C. is at least one polymer selected from the group consisting of polyamide, and polyester.

4. The method of producing the polyimide resin composition in claim 3, wherein the aforementioned polyamide or polyester is a liquid crystal polymer.

5. The method of producing the polyimide resin composition in claim 1, 2, or 4, wherein the afore mentioned aromatic acid anhydride is pyromellitic anhydride and the aforementioned aromatic diamine is oxydianiline.

6. The method of producing the polyimide resin composition in claim 3, wherein the aforementioned aromatic acid anhydride is pyromellitic anhydride and the aforementioned aromatic diamine is oxydianiline.

\* \* \* \* \*